(12) United States Patent
Kan et al.

(10) Patent No.: US 12,170,639 B1
(45) Date of Patent: Dec. 17, 2024

(54) HETEROGENEOUS ACCELERATION METHOD, APPARATUS AND SYSTEM AND COMPUTER READABLE STORAGE MEDIUM

(71) Applicant: SUZHOU METABRAIN INTELLIGENT TECHNOLOGY CO., LTD., Jiangsu (CN)

(72) Inventors: Hongwei Kan, Jiangsu (CN); Weifeng Gong, Jiangsu (CN); Rengang Li, Jiangsu (CN); Yanwei Wang, Jiangsu (CN); Jiaheng Fan, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/716,492

(22) PCT Filed: Jun. 28, 2022

(86) PCT No.: PCT/CN2022/102087
§ 371 (c)(1),
(2) Date: Jun. 4, 2024

(87) PCT Pub. No.: WO2023/206787
PCT Pub. Date: Nov. 2, 2023

(30) Foreign Application Priority Data

Apr. 29, 2022 (CN) .......................... 202210468196.1

(51) Int. Cl.
*H04L 51/066* (2022.01)

(52) U.S. Cl.
CPC ................................. *H04L 51/066* (2013.01)

(58) Field of Classification Search
CPC ..................................................... H04L 51/066
See application file for complete search history.

(56) References Cited

U.S. PATENT DOCUMENTS

| 10,394,485 B1 | 8/2019 | Chen et al. |
| 2013/0275631 A1 | 10/2013 | Magro et al. |

(Continued)

FOREIGN PATENT DOCUMENTS

| CN | 104660574 A | 5/2015 |
| CN | 111343148 A | 6/2020 |

(Continued)

OTHER PUBLICATIONS

Corresponding International Patent Application No. PCT/CN2022/102087, International Search Report, Date Mailed Dec. 15, 2022.

(Continued)

*Primary Examiner* — Austin J Moreau
(74) *Attorney, Agent, or Firm* — Cooper Legal Group, LLC

(57) ABSTRACT

A heterogeneous acceleration method, including the following steps: analyzing a received target data packet to obtain data source end identification information; when the data source end identification information does not exist in a configuration information table, customizing a data message format according to the target data packet to obtain a target data message format, or when the data source end identification information exists in the configuration information table, reading the target data message format from the configuration information table; and according to the target data message format, performing acceleration processing on the target data packet to obtain processed data, and returning the processed data to a data source end.

20 Claims, 3 Drawing Sheets

(56) References Cited

U.S. PATENT DOCUMENTS

2018/0157503 A1    6/2018  Teh et al.
2021/0191867 A1*   6/2021  Lengacher .......... G06F 12/0842
2022/0131799 A1*   4/2022  Zheng ..................... H04L 49/15
2022/0217085 A1*   7/2022  Sankar .................. H04L 49/254

FOREIGN PATENT DOCUMENTS

CN    111708761 A    9/2020
CN    112416840 A    2/2021
CN    113900982 A    1/2022
CN    114138476 A    3/2022

OTHER PUBLICATIONS

Corresponding International Patent Application No. PCT/CN2022/102087, Written Report, Date Mailed Dec. 15, 2022.
Corresponding Chinese Patent Application No. CN202210468196.1, Notification to Grant Patent dated Jul. 14, 2023.

* cited by examiner

US 12,170,639 B1

HETEROGENEOUS ACCELERATION METHOD, APPARATUS AND SYSTEM AND COMPUTER READABLE STORAGE MEDIUM

CROSS-REFERENCE TO RELATED APPLICATION

This application claims priority to Chinese Patent Application No. CN202210468196.1, filed on Apr. 29, 2022 in China National Intellectual Property Administration and entitled "Heterogeneous Acceleration Method, Apparatus and System and Computer Readable Storage Medium", which is hereby incorporated by reference in its entirety.

FIELD

The present application relates to the technical field of artificial intelligence (AI), in particular to a heterogeneous acceleration method, apparatus and system and a computer-readable storage medium.

BACKGROUND

With the rapid development of various applications of AI, the demand for computing power is increasing. General-purpose computing with a central processing unit (CPU) as a processing core can no longer meet the demand of AI applications for the computing power. Heterogeneous computing represented by a graphics processing unit (GPU) and a field programmable gate array (FPGA) began to be deployed in a server.

According to the current mainstream deployment mode, various heterogeneous acceleration cards are inserted into the server through peripheral component interconnect express (PCIE) slots. In the heterogeneous acceleration processing flow, a data source end sends data to be accelerated to the server, and the server converts the data into data of a PCIE protocol. The server stores the received data to a hard disk, a FPGA acceleration card reads the data from the hard disk for acceleration processing and returns processed data to the server, and the server returns the processed data to the foregoing data source end. In this deployment mode, the server needs to be powered down to complete the plugging and unplugging of a hardware card, which cannot realize convenient and fast deployment and use. The existing heterogeneous acceleration processing flow needs to go through the protocol processing and forwarding process of the server, which has a high transmission delay and strong dependence on the server, and even affects the normal business of the server.

SUMMARY

An embodiment of the present application provides a heterogeneous acceleration method, including:
analyzing a received target data packet to obtain data source end identification information;
customizing, in response to the data source end identification information not existing in a configuration information table, a data message format according to the target data packet to obtain a target data message format, or reading, in response to the data source end identification information existing in the configuration information table, the target data message format from the configuration information table; and
performing, according to the target data message format, acceleration processing on the target data packet to obtain processed data, and returning the processed data to a data source end.

In an implementation, after customizing the data message format according to the target data packet to obtain the target data message format, the method further includes: updating the configuration information table according to the target data message format.

In an implementation, before customizing the data message format according to the target data packet after determining that the data source end identification information does not exist in the configuration information table, the method further includes:
determining whether a configuration field exists in the target data packet; and
skipping responding to the target data packet in response to a non-existence of the configuration field, or performing the customizing the data message format according to the target data packet in response to an existence of the configuration field.

In the present implementation, the customizing the data message format according to the target data packet includes:
reading the configuration field;
determining whether the configuration field is designated data; and
performing the skipping responding to the target data packet in response to the configuration field being not designated data, or performing the customizing the data message format according to the target data packet in response to the configuration field being designated data.

An embodiment of the present application further provides a heterogeneous acceleration apparatus, including:
a data packet analysis module, configured to analyze a received target data packet to obtain data source end identification information;
a message format customizing module, configured to customize, in response to the data source end identification information not existing in a configuration information table, a data message format according to the target data packet to obtain a target data message format;
a message format reading module, configured to read, in response to the data source end identification information existing in the configuration information table, the target data message format from the configuration information table; and
an acceleration processing module, configured to perform, according to the target data message format, acceleration processing on the target data packet to obtain processed data, and return the processed data to a data source end.

An embodiment of the present application further provides a heterogeneous acceleration system, including:
a data source end, configured to: send a target data packet to a FPGA heterogeneous acceleration card, and receive processed data; and
the FPGA heterogeneous acceleration card, configured to: analyze the target data packet to obtain data source end identification information; customize, in response to the data source end identification information not existing in a configuration information table, a data message format according to the target data packet to obtain a target data message format, or read, in response to the data source end identification information existing in the configuration information table, the target data message format from the configuration information table; and perform, according to the target data message format, acceleration processing on the target data packet to obtain the processed data, and return the processed data to the data source end.

In an implementation, the FPGA heterogeneous acceleration card is further configured to update the configuration information table according to the target data message format after customizing the data message format according to the target data packet to obtain the target data message format.

In an implementation, the FPGA heterogeneous acceleration card is configured to:
  determine whether a configuration field exists in the target data packet before the customizing the data message format according to the target data packet after determining that the data source end identification information does not exist in the configuration information table; and
  skip responding to the target data packet in response to a non-existence of the configuration field, or perform the customizing the data message format according to the target data packet in response to an existence of the configuration field.

In an implementation, the FPGA heterogeneous acceleration card is further configured to:
  read the configuration field;
  determine whether the configuration field is designated data; and
  perform the skipping responding to the target data packet in response to the configuration field being not designated data, or perform the customizing the data message format according to the target data packet in response to the configuration field being designated data.

In an implementation, the heterogeneous acceleration system further includes an optical switch arranged between the data source end and the FPGA heterogeneous acceleration card.

The data source end is configured to send the target data packet to the optical switch.

The optical switch is configured to forward the target data packet to the FPGA heterogeneous acceleration card, and forward the processed data to the data source end.

The FPGA heterogeneous acceleration card is further configured to return the processed data to the optical switch.

In an implementation, the heterogeneous acceleration system further includes a movable power supply apparatus. The movable power supply apparatus is configured to supply power to the FPGA heterogeneous acceleration card.

In an implementation, a PCIE slot is provided in the movable power supply apparatus. The movable power supply apparatus is configured to supply power to the FPGA heterogeneous acceleration card by butting the PCIE slot with a PCIE gold finger of the FPGA heterogeneous acceleration card.

In an implementation, the movable power supply apparatus includes an external power interface and a power adapter. The movable power supply apparatus is further configured to connect a system external power supply through the external power interface, convert a first voltage value provided by the system external power supply into a second voltage value required by the FPGA heterogeneous acceleration card through the power adapter, and supply power to the FPGA heterogeneous acceleration card based on the second voltage value.

An embodiment of the present application further provides one or more non-volatile computer-readable storage media storing computer readable instructions. The computer-readable instructions, when executed by one or more processors, cause the one or more processors to perform the steps of the heterogeneous acceleration method in any of the foregoing embodiments.

BRIEF DESCRIPTION OF THE DRAWINGS

In order to describe the embodiments of the present application or the technical solutions in the related art more clearly, drawings required to be used in the embodiments or the illustration of the related art will be briefly introduced below. Apparently, the drawings in the illustration below are only some embodiments of the present application. A person of ordinary skill in the art also can obtain other drawings according to the provided drawings without creative work.

DETAILED DESCRIPTION

In order that a person skilled in the art better understands the solutions in the embodiments of the present application, the present application will be further described in detail with reference to the accompanying drawings and implementations. Obviously, the described embodiments are only a part of the embodiments of the present application, rather than all the embodiments. Based on the embodiments of the present application, all other embodiments obtained by a person of ordinary skill in the art without creative work shall fall within the protection scope of the present application.

Figure 1:
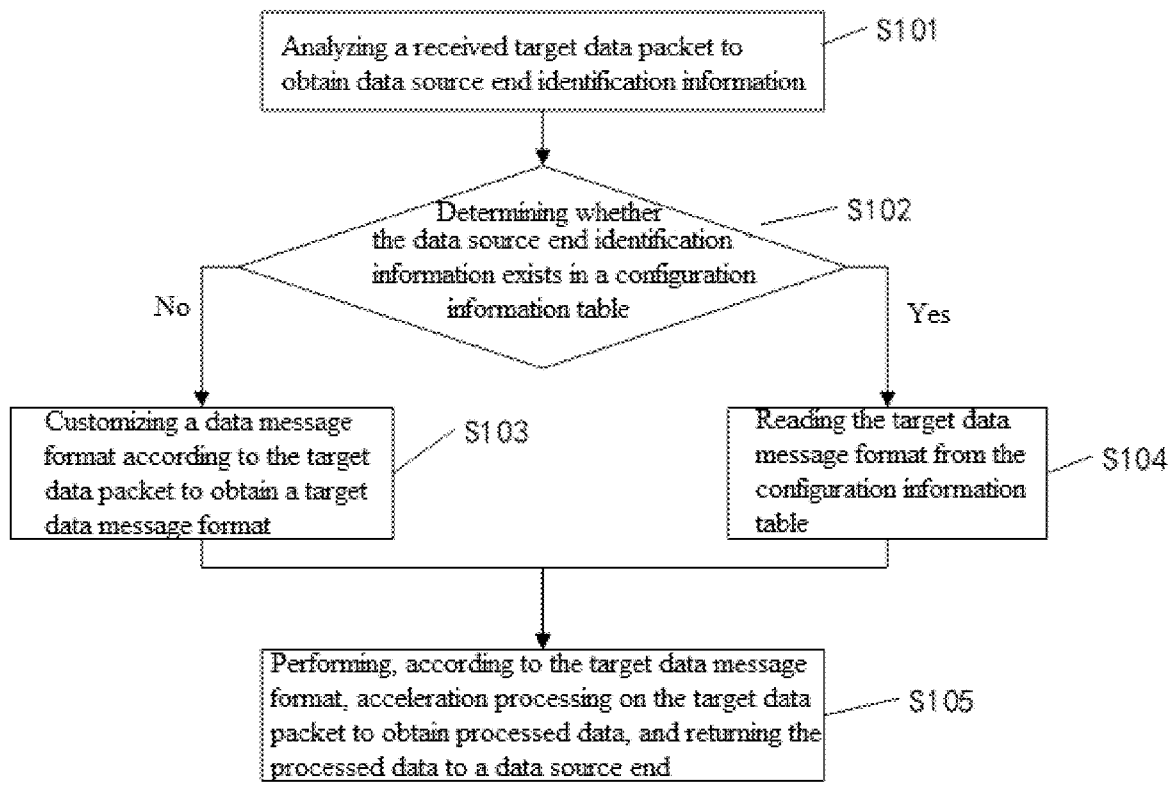
FIG. 1 is an implementation flow chart of a heterogeneous acceleration method according to one or more embodiments.

Reference is made to FIG. 1. FIG. 1 is an implementation flow chart of a heterogeneous acceleration method according to one or more embodiments. The method may include step S101, step S103, step S104, and step S105.

Step S101: analyzing a received target data packet to obtain data source end identification information.

When a data source end is required to perform acceleration processing on the target data packet, the target data packet is directly sent to a FPGA heterogeneous acceleration card. The target data packet includes the data source end identification information, and may further include a data format of the data source end, a kernel type used for the acceleration processing of the target data packet, a destination Internet protocol (IP) to be sent after the acceleration processing of the target data packet is completed, and other information.

The FPGA heterogeneous acceleration card receives the target data packet, and analyzes the received target data packet to obtain the data source end identification information. The data source end identification information may be a data source end Internet Protocol address (Source IP) of the target data packet to be accelerated.

Step S103: customizing, when the data source end identification information does not exist in a configuration information table, a data message format according to the target data packet to obtain a target data message format.

The configuration information table is set in advance. A correspondence between various data source end identification information and various data message formats is stored in the configuration information table. After the received target data packet is analyzed to obtain the data source end identification information, the configuration information table is looked up according to the data source end identification information to determine whether the data source end identification information exists. When the data source end identification information does not exist in the configuration information table, the data message format is customized according to the target data packet to obtain the target data message format. The FPGA heterogeneous acceleration card customizes the data message format according to own characteristics of the target data packet to be accelerated, a data communication between the data source end and the FPGA heterogeneous acceleration card is realized in a frame format, a data coding mode and a transmission rule of customized data transmission, and the customized target data message format is adaptive to the target data packet to be accelerated. Step S103 may include: customizing, in response to the data source end identification information not existing in a configuration information table, a data message format according to the target data packet to obtain a target data message format.

Step S104: reading, when the data source end identification information exists in the configuration information table, the target data message format from the configuration information table.

When the data source end identification information is matched from the configuration information table, it is indicated that the target data message format corresponding to the current data source end identification information exists in the configuration information table, and the target data message format is read from the configuration information table. By storing the correspondence between various data source end identification information and various data message formats in advance in the configuration information table, the target data message format corresponding to the data source end identification information may be directly retrieved from the configuration information table after the data source end identification information is analyzed from the target data packet, whereby the processing flow required for the acceleration processing of the data packet to be accelerated can be quickly determined, and the heterogeneous acceleration processing efficiency is further improved. Step S104 may include: reading, in response to the data source end identification information existing in the configuration information table, the target data message format from the configuration information table.

Step S105: performing, according to the target data message format, acceleration processing on the target data packet to obtain processed data, and returning the processed data to a data source end.

In the flow shown in FIG. 1, step S102 is further included. Step S102 is configured for determining whether the data source end identification information exists in the configuration information table. According to the determination result of step S102, step S103 or step S104 may be performed accordingly.

After obtaining the target data message format corresponding to the target data packet to be accelerated, acceleration processing is performed on the target data packet according to the target data message format to obtain the processed data, and the processed data is returned to the data source end. For example, the FPGA heterogeneous acceleration card analyzes the target data packet according to the data format in the target data message format to obtain analyzed data to be accelerated, performs acceleration processing on the data to be accelerated according to the kernel type used in the target data message format, for example, realizing the acceleration of applications such as AI and high-performance computing, to obtain the processed data, and returns the processed data to the data source end. The data source end identification information is matched from the configuration information table, the target data message format corresponding to the data source end identification information is directly read from the configuration information table according to the matching result, or the data message format is customized according to own characteristics of the target data packet to be accelerated, whereby the target data message format is adaptive to the target data packet to be accelerated. The target data packet to be accelerated is not required to be converted into data of a PCIE protocol under a protocol by a server in advance. The hard disk storage, forwarding and protocol processing flow of the server to the data to be accelerated are omitted, the dependence on the server is avoided, and the transmission delay is reduced.

As can be seen from the above-mentioned technical solutions, when the data source end is required to perform acceleration processing on the target data packet, the target data packet is directly sent to a FPGA heterogeneous acceleration card. The FPGA heterogeneous acceleration card analyzes the target data packet to obtain the data source end identification information, and the configuration information table is looked up according to the data source end identification information to determine whether the data source end identification information exists. If the data source end identification information is matched from the configuration information table, the target data message format is directly read from the configuration information table, and acceleration processing is performed on the target data packet according to the target data message format. If the data source end identification information is not matched from the configuration information table, the data message format is customized according to the target data packet to be accelerated to obtain the target data message format, and acceleration processing is performed on the target data packet according to the target data message format. Therefore, a direct data communication between a host and the FPGA heterogeneous acceleration card is realized without the protocol processing and forwarding process of a server. The system structure is simplified for convenient deployment, thereby greatly reducing the transmission delay and avoiding the dependence on the server.

It should be noted that based on the above-mentioned embodiments, some improvements are also provided below. In some embodiments below, the same steps or corresponding steps as in the above-mentioned embodiments may be cross-referenced, and the corresponding beneficial effects may also be cross-referenced, which will not be described in detail in the following embodiments.

Figure 2:
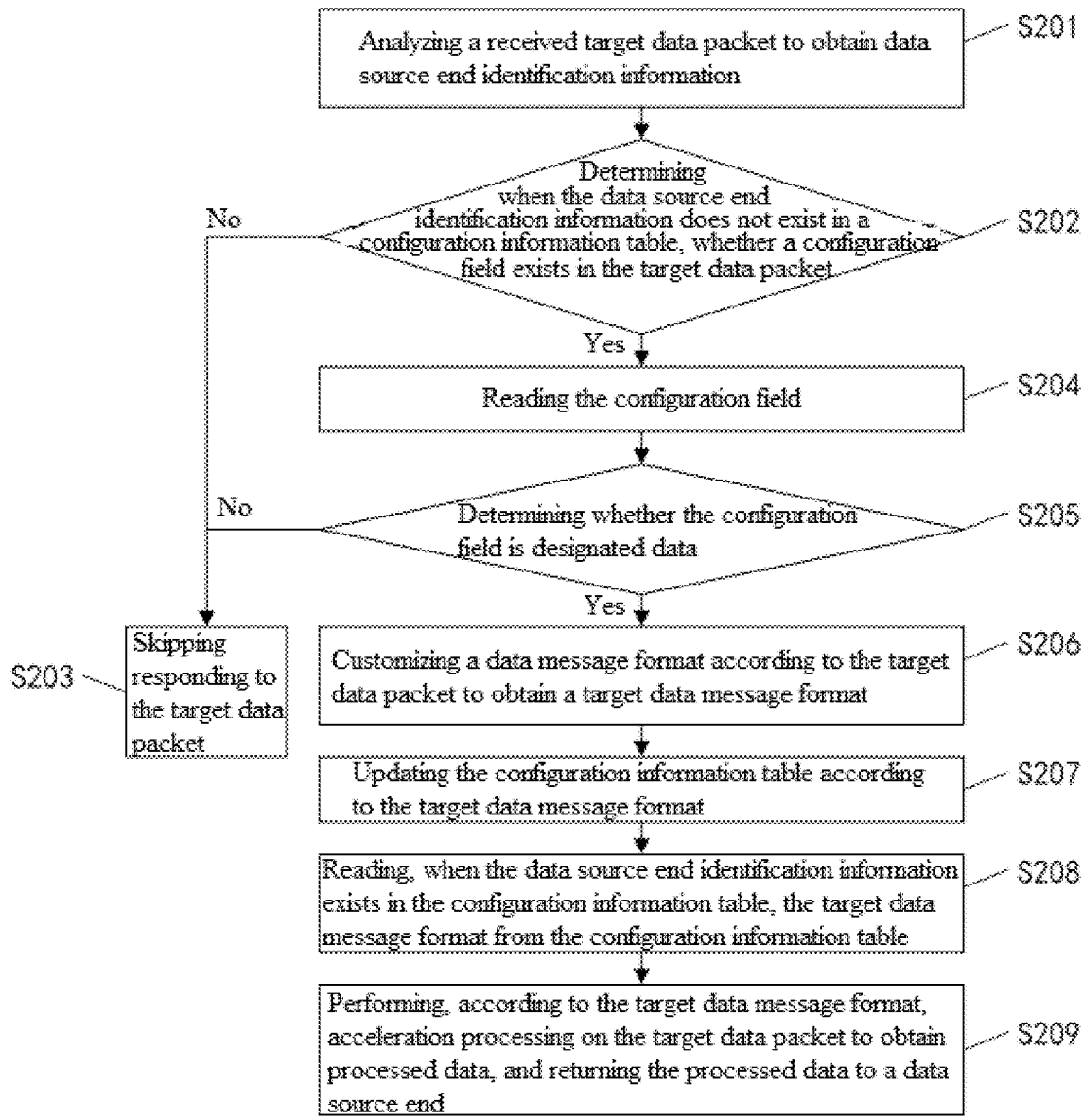
FIG. 2 is another implementation flow chart of a heterogeneous acceleration method according to one or more embodiments.

Reference is made to FIG. 2. FIG. 2 is another implementation flow chart of a heterogeneous acceleration method according to one or more embodiments. The method may include step S201 to step S209.

Step S201: analyzing a received target data packet to obtain data source end identification information.

Figure 3:
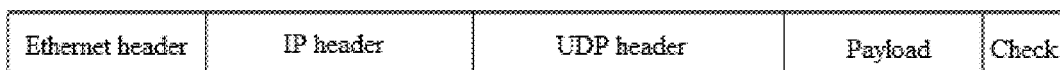
FIG. 3 is a structural block diagram of a network data packet format according to one or more embodiments.

Reference is made to FIG. 3. FIG. 3 is a structural block diagram of a network data packet format in an embodiment of the present application. After being powered on to obtain own IP address, a FPGA heterogeneous acceleration card receives a target data packet configured by a data source end using a customized network packet data format. Network transmission is divided into a physical layer, a link layer, a network layer, and a transmission layer. A standard packet format is shown in FIG. 3. An Ethernet header is the link layer, an IP header is the network layer, and a user datagram protocol (UDP) header is the transmission layer. The position of payload (PAYLOAD) is used for customizing a data packet format for communication, so as to complete the functional configuration of the FPGA heterogeneous acceleration card. The FPGA heterogeneous acceleration card communicates and interacts with the data source end through the customized network data packet to realize the acceleration of applications such as AI and high-performance computing.

Step S202: determining, when the data source end identification information does not exist in a configuration information table, whether a configuration field exists in the target data packet. If the configuration field does not exist in the target data packet, step S203 is performed. If the configuration field exists in the target data packet, step S204 is performed.

When the data source end identification information does not exist in the configuration information table, the target data packet received currently may be a configuration packet for custom configuration, and it is determined whether a configuration field (Config) exists in the target data packet. If the configuration field does not exist in the target data packet, it is indicated that the target data packet does not belong to the configuration packet, and step S203 is performed. If the configuration field exists in the target data packet, it is indicated that the target data packet belongs to the configuration packet, and step S206 is performed.

Figure 4:
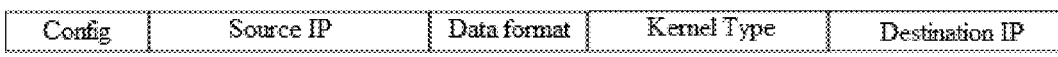
FIG. 4 is a structural block diagram of a customized data packet format according to one or more embodiments.

Reference is made to FIG. 4. FIG. 4 is a structural block diagram of a customized data packet format in an embodiment of the present application.

Configuration field (Config): configuration enable bit, which represents the data message as a configuration message if designated data is received.

Source IP: source IP of the data to be accelerated. If the FPGA heterogeneous acceleration card receives data sent by the IP address, the data is considered to be data to be processed. If data messages and configuration fields of other IP addresses do not match the designated data, the data message is considered to be invalid.

Data format: data format of a designated data source. The FPGA heterogeneous acceleration card analyzes the data according to the data format. For example, the data format is a video stream.

Used kernel type: algorithm type used for the data to be processed.

Destination IP: destination IP. The result is sent to the IP address after the data is processed according to a designated algorithm.

Step S203: skipping responding to the target data packet.

When determining that the configuration field does not exist in the target data packet, it is indicated that the target data packet does not belong to the configuration packet, and the target data packet is not responded.

Step 204: reading the configuration field.

When determining that the configuration field exists in the target data packet, the configuration field is read.

Step S205: determining whether the configuration field is designated data. If the configuration field is not designated data, step S203 is re-performed. If the configuration field is designated data, step S206 is performed.

The preset configuration field is configured for identifying that the configuration field is designated data for enabling configuration of the data message format. After reading the configuration field, it is determined whether the configuration field is designated data. If the configuration field is not designated data, it is indicated that the configuration of the data message format is not enabled currently and the target data packet is not responded. If the configuration field is designated data, it is indicated that the current target data packet is indeed a configuration packet for custom configuration, and step S206 is performed.

Step S206: customizing a data message format according to the target data packet to obtain a target data message format.

The FPGA heterogeneous acceleration card includes a configuration information module, a protocol processing module, a network data transceiver module, and an acceleration execution unit module. The configuration information module is implemented by random access memory (RAM) or register resources of the FPGA heterogeneous acceleration card. After the heterogeneous acceleration card is powered on, the configuration information module is configured by a connected host computer according to the data packet format, and the configuration information will be updated according to the configuration message. The configuration table information is null during power-on initialization. The configuration mode is that when the FPGA heterogeneous acceleration card receives a network data packet from the data source end, the configuration mode is entered, and a payload data segment is analyzed according to a custom format. When the configuration field is checked to be designated data, the message is continuously received. The FPGA heterogeneous acceleration card stores the source IP, the data format, the used kernel type, and the destination IP in the RAM or register of the FPGA heterogeneous acceleration card.

Step S207: updating the configuration information table according to the target data message format.

After customizing the data message format according to the target data packet to obtain the target data message format, the configuration information table is updated according to the target data message format. That is, the data source end identification information and the target data message format are correspondingly stored in the configuration information table. Therefore, it is convenient to subsequently read the target data message format from the configuration information table according to the data source end identification information and then to perform acceleration processing on the target data packet according to the directly read target data message format.

Step S208: reading, when the data source end identification information exists in the configuration information table, the target data message format from the configuration information table.

Step S209: performing, according to the target data message format, acceleration processing on the target data packet to obtain processed data, and returning the processed data to a data source end.

In some optional implementations, before customizing the data message format according to the target data packet after determining that the data source end identification information does not exist in the configuration information table, the method further includes: determining whether a configuration field exists in the target data packet; and skipping responding to the target data packet in response to the non-existence of the configuration field, or performing the step of customizing a data message format according to the target data packet in response to the existence of the configuration field.

In some optional implementations, the step of customizing a data message format according to the target data packet includes: reading the configuration field; determining whether the configuration field is designated data; and performing the step of skipping responding to the target data packet in response to the configuration field being not designated data, or performing the step of customizing a data message format according to the target data packet in response to the configuration field being designated data.

The present application also provides a heterogeneous acceleration apparatus corresponding to the aforementioned embodiment of the heterogeneous acceleration method. The heterogeneous acceleration apparatus described below and the heterogeneous acceleration method described above may be referred to in correspondence with each other.

Figure 5:
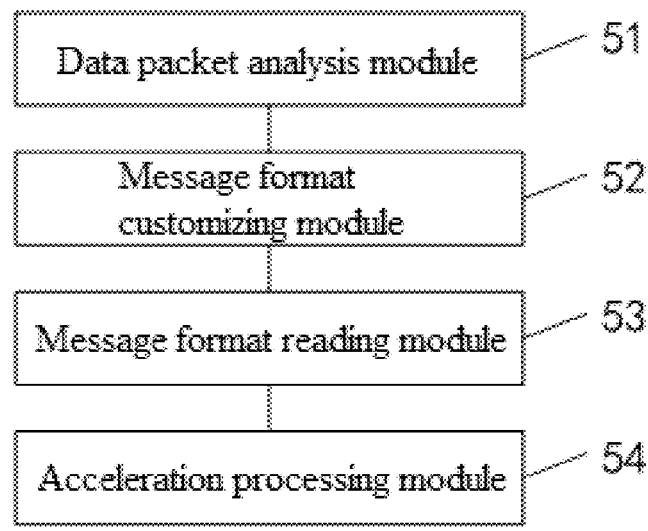
FIG. 5 is a structural block diagram of a heterogeneous acceleration apparatus according to one or more embodiments.

Reference is made to FIG. 5. FIG. 5 is a structural block diagram of a heterogeneous acceleration apparatus in an embodiment of the present application. The apparatus may include:

a data packet analysis module 51, configured to analyze a received target data packet to obtain data source end identification information;

a message format customizing module 52, configured to customize, when the data source end identification information does not exist in a configuration information table, a data message format according to the target data packet to obtain a target data message format;

a message format reading module 53, configured to read, when the data source end identification information exists in the configuration information table, the target data message format from the configuration information table; and an acceleration processing module 54, configured to perform, according to the target data message format, acceleration processing on the target data packet to obtain processed data, and return the processed data to a data source end.

In some optional implementations, the message format customizing module 52 is configured to customize, in response to the data source end identification information not existing in the configuration information table, the data message format according to the target data packet to obtain the target data message format. The message format reading module 53 is configured to read, in response to the data source end identification information existing in the configuration information table, the target data message format from the configuration information table.

As can be seen from the above-mentioned technical solutions, when the data source end is required to perform acceleration processing on the target data packet, the target data packet is directly sent to a FPGA heterogeneous acceleration card. The FPGA heterogeneous acceleration card analyzes the target data packet to obtain the data source end identification information, and the configuration information table is looked up according to the data source end identification information to determine whether the data source end identification information exists. If the data source end identification information is matched from the configuration information table, the target data message format is directly read from the configuration information table, and acceleration processing is performed on the target data packet according to the target data message format. If the data source end identification information is not matched from the configuration information table, the data message format is customized according to the target data packet to be accelerated to obtain the target data message format, and acceleration processing is performed on the target data packet according to the target data message format. Therefore, a direct data communication between a host and the FPGA heterogeneous acceleration card is realized without the protocol processing and forwarding process of a server. The system structure is simplified for convenient deployment, thereby greatly reducing the transmission delay and avoiding the dependence on the server.

In an implementation of the present application, the heterogeneous acceleration apparatus may further include:

a configuration information table update module, configured to update the configuration information table according to the target data message format after customizing the data message format according to the target data packet to obtain the target data message format.

In an implementation of the present application, the heterogeneous acceleration apparatus may further include:

a determination module, configured to determine whether a configuration field exists in the target data packet before the customizing a data message format according to the target data packet after determining that the data source end identification information does not exist in the configuration information table; and a response rejection module, configured to skip responding to the target data packet when determining that the configuration field does not exist in the target data packet.

Accordingly, the message format customizing module 52 is configured to customize the data message format according to the target data packet when determining that the configuration field exists in the target data packet.

In some optional implementations, the response rejection module is configured to skip responding to the target data packet in response to the configuration field not existing in the target data packet.

In an implementation, the message format customizing module 52 includes:

a field reading submodule, configured to read the configuration field;

a determination submodule, configured to determine whether the configuration field is designated data, wherein the response rejection module is further configured to skip responding to the target data packet when determining that the configuration field is not designated data; and a message format customizing submodule, configured to customize the data message format according to the target data packet when determining that the configuration field is designated data.

In some optional implementations, the response rejection module is configured to skip responding to the target data packet in response to the configuration field being not designated data. The message format customizing submodule is configured to customize the data message format according to the target data packet in response to the configuration field being designated data.

The present application also provides a heterogeneous acceleration system corresponding to the above embodiment of the heterogeneous acceleration method. The heterogeneous acceleration system described below and the heterogeneous acceleration method described above may be referred to in correspondence with each other.

Figure 6:
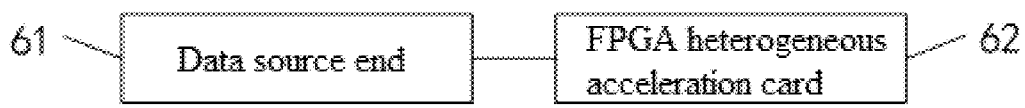
FIG. 6 is a structural block diagram of a heterogeneous acceleration system according to one or more embodiments.

Reference is made to FIG. 6. FIG. 6 is a structural block diagram of a heterogeneous acceleration system in an embodiment of the present application. The heterogeneous acceleration system may include:

a data source end 61, configured to: send a target data packet to a FPGA heterogeneous acceleration card 62, and receive processed data; and the FPGA heterogeneous acceleration card 62, configured to: analyze the target data packet to obtain data source end 61 identification information: customize, when the data source end 61 identification information does not exist in a configuration information table, a data message format according to the target data packet to obtain a target data message format, or read, when the data source end 61 identification information exists in the configuration information table, the target data message format from the configuration information table; and perform, according to the target data message format, acceleration processing on the target data packet to obtain processed data, and return the processed data to the data source end 61.

In some optional implementations, the FPGA heterogeneous acceleration card is configured to: analyze the target data packet to obtain the data source end identification information: customize, in response to the data source end identification information not existing in the configuration information table, the data message format according to the target data packet to obtain the target data message format, or read, in response to the data source end identification information existing in the configuration information table, the target data message format from the configuration information table; and perform, according to the target data message format, acceleration processing on the target data packet to obtain the processed data, and return the processed data to the data source end.

As can be seen from the above-mentioned technical solutions, when the data source end is required to perform acceleration processing on the target data packet, the target data packet is directly sent to a FPGA heterogeneous acceleration card. The FPGA heterogeneous acceleration card analyzes the target data packet to obtain the data source end identification information, and the configuration information table is looked up according to the data source end identification information to determine whether the data source end identification information exists. If the data source end identification information is matched from the configuration information table, the target data message format is directly read from the configuration information table, and acceleration processing is performed on the target data packet according to the target data message format. If the data source end identification information is not matched from the configuration information table, the data message format is customized according to the target data packet to be accelerated to obtain the target data message format, and acceleration processing is performed on the target data packet according to the target data message format. Therefore, a direct data communication between a host and the FPGA heterogeneous acceleration card is realized without the protocol processing and forwarding process of a server. The system structure is simplified for convenient deployment, thereby greatly reducing the transmission delay and avoiding the dependence on the server.

In an implementation, the FPGA heterogeneous acceleration card 62 is further configured to update the configuration information table according to the target data message format after customizing the data message format according to the target data packet to obtain the target data message format.

In an implementation of the present application, the FPGA heterogeneous acceleration card 62 is further configured to: determine, before customizing the data message format according to the target data packet after determining that the data source end 61 identification information does not exist in the configuration information table, whether a configuration field exists in the target data packet: skip responding to the target data packet if the configuration field does not exist in the target data packet; and perform the step of customizing a data message format according to the target data packet if the configuration field exists in the target data packet. The FPGA heterogeneous acceleration card 62 may skip responding to the target data packet in response to the non-existence of the configuration field, or perform the step of customizing a data message format according to the target data packet in response to the existence of the configuration field.

In an implementation, the FPGA heterogeneous acceleration card 62 is further configured to: read the configuration field; determine whether the configuration field is designated data: perform the step of skipping responding to the target data packet if the configuration field is not designated data; and perform the step of customizing a data message format according to the target data packet if the configuration field is designated data. The FPGA heterogeneous acceleration card 62 may perform the step of skipping responding to the target data packet in response to the configuration field being not designated data, or perform the step of customizing a data message format according to the target data packet in response to the configuration field being designated data.

In an implementation of the present application, the heterogeneous acceleration system further includes an optical switch arranged between the data source end 61 and the FPGA heterogeneous acceleration card 62. At this moment, the data source end 61 is further configured to send the target data packet to the optical switch. The optical switch is configured to forward the target data packet to the FPGA heterogeneous acceleration card 62, and forward the processed data to the data source end 61. The FPGA heterogeneous acceleration card 62 is further configured to return the processed data to the optical switch.

The heterogeneous acceleration system provided by the embodiments of the present application may further include an optical switch arranged between the data source end 61 and the FPGA heterogeneous acceleration card 62. The data source end 61 sends the target data packet to the optical switch. The optical switch forwards the target data packet to the FPGA heterogeneous acceleration card 62. The FPGA heterogeneous acceleration card 62 returns the processed data to the optical switch after performing acceleration processing on the target data packet. The optical switch forwards the processed data to the data source end 61. In a portable FPGA heterogeneous acceleration system, the FPGA heterogeneous acceleration card 62 is directly mounted in a network interface of the optical switch through the optical switch, so as to realize a hardware link connection between the heterogeneous acceleration card and the data source end 61, thereby providing an exclusive electrical signal path between the data source end 61 and the FPGA heterogeneous acceleration card 62.

In an implementation, the heterogeneous acceleration system further includes a movable power supply apparatus. The movable power supply apparatus is configured to supply power to the FPGA heterogeneous acceleration card 62.

The heterogeneous acceleration system provided in the embodiments of the present application may further include the movable power supply apparatus for supplying power to the FPGA heterogeneous acceleration card 62. Compared with the existing server-dependent power supply mode, the power supply mode of the movable power supply apparatus in the embodiments of the present application greatly improves the convenience.

In an implementation, a PCIE slot is provided in the movable power supply apparatus. At this moment, the movable power supply apparatus is further configured to supply power to the FPGA heterogeneous acceleration card 62 by butting the PCIE slot with a PCIE gold finger of the FPGA heterogeneous acceleration card 62.

The height and length of the movable power supply apparatus may be set to be equal to those of the FPGA heterogeneous acceleration card 62. When the FPGA heterogeneous acceleration card 62 is used, the power supply apparatus and the heterogeneous acceleration card are inserted correspondingly, whereby the PCIE slot in the power supply apparatus is butted with the PCIE gold finger of the FPGA heterogeneous acceleration card 62, thereby realizing a plug-and-play portable deployment.

In an implementation, the movable power supply apparatus further includes an external power interface and a power adapter. At this moment, the movable power supply apparatus is further configured to connect a system external power supply through the external power interface, convert a first voltage value provided by the system external power supply into a second voltage value required by the FPGA heterogeneous acceleration card 62 through the power adapter, and supply power to the FPGA heterogeneous acceleration card 62 based on the second voltage value.

The movable power supply apparatus further includes an external power interface and a power adapter. The movable power supply apparatus is further configured to connect a system external power supply through the external power interface, convert a first voltage value provided by the system external power supply into a second voltage value required by the FPGA heterogeneous acceleration card 62 through the power adapter, and supply power to the FPGA heterogeneous acceleration card 62 based on the second voltage value. For example, a power line is provided on the outside of the movable power supply apparatus to be directly connected to 220 V, and a voltage of 12 V is converted through the power adapter, so as to complete the power supply of the FPGA heterogeneous acceleration card 62.

An embodiment of the present application further provides one or more non-volatile computer-readable storage media storing computer readable instructions. The computer-readable instructions, when executed by one or more processors, cause the one or more processors to perform the steps of the heterogeneous acceleration method in any of the foregoing embodiments.

The computer-readable storage medium may include: a USB flash drive, a removable hard disk, a read-only memory (ROM), a RAM, a magnetic disk, or an optical disk, and other media which may store program codes.

The computer-readable storage medium provided in the embodiments of the present application may be introduced with reference to the above-mentioned method embodiment. Details are not described herein.

The same or similar parts in the embodiments of this specification may be referred to each other. As to the apparatus, the system and the computer-readable storage medium disclosed in the embodiments, since the system and the computer-readable storage medium correspond to the method disclosed in the embodiments, the description is relatively simple. The relevant parts may be described with reference to the method section.

The principles and implementations of the present application have been set forth herein using certain examples. The above embodiments have been set forth only to aid in the understanding of the technical solutions and core ideas of the present application. It should be noted that a person of ordinary skill in the art may make numerous improvements and modifications to the present application without departing from the principles of the present application. Such improvements and modifications are intended to be within the scope of protection of the appended claims of the present application.

What is claimed is:

1. A heterogeneous acceleration method, comprising:
   analyzing a received target data packet to obtain data source end identification information;
   customizing, in response to the data source end identification information not existing in a configuration information table, a data message format according to the received target data packet to obtain a target data message format, or reading, in response to the data source end identification information existing in the configuration information table, the target data message format from the configuration information table; and
   performing, according to the target data message format, acceleration processing on the received target data packet to obtain processed data, and returning the processed data to a data source end.

2. The heterogeneous acceleration method according to claim 1, wherein after the customizing the data message format according to the received target data packet to obtain the target data message format, the method further comprises:
   updating the configuration information table according to the target data message format.

3. The heterogeneous acceleration method according to claim 1, wherein before the customizing the data message format according to the received target data packet and after determining that the data source end identification information does not exist in the configuration information table, the method further comprises:
   determining whether a configuration field exists in the received target data packet; and
   skipping responding to the received target data packet in response to a non-existence of the configuration field, or performing the customizing the data message format according to the received target data packet in response to an existence of the configuration field.

4. The heterogeneous acceleration method according to claim 3, wherein the customizing the data message format according to the received target data packet comprises:
   reading the configuration field;
   determining whether the configuration field is designated data; and
   performing the skipping responding to the received target data packet in response to the configuration field being not the designated data, or performing the customizing the data message format according to the received target data packet in response to the configuration field being the designated data.

5. A heterogeneous acceleration system, comprising:
   a data source end, configured to send a target data packet to a field programmable gate array (FPGA) heterogeneous acceleration card, and receive processed data; and the FPGA heterogeneous acceleration card, configured to analyze the target data packet to obtain data source end identification information; customize, in response to the data source end identification information not existing in a configuration information table, a data message format according to the target data packet to obtain a target data message format, or read, in response to the data source end identification information existing in the configuration information table, the target data message format from the configuration information table; and perform, according to the target data message format, acceleration processing on the target data packet to obtain the processed data, and return the processed data to the data source end.

6. The heterogeneous acceleration system according to claim 5, wherein the FPGA heterogeneous acceleration card is further configured to update the configuration information table according to the target data message format after customizing the data message format according to the target data packet to obtain the target data message format.

7. The heterogeneous acceleration system according to claim 5, wherein the FPGA heterogeneous acceleration card is further configured to:
   determine whether a configuration field exists in the target data packet before customizing the data message format according to the target data packet and after determining that the data source end identification information does not exist in the configuration information table; and
   skip responding to the target data packet in response to a non-existence of the configuration field, or perform the customizing the data message format according to the target data packet in response to an existence of the configuration field.

8. The heterogeneous acceleration system according to claim 7, wherein the FPGA heterogeneous acceleration card is further configured to:
   read the configuration field;
   determine whether the configuration field is designated data; and
   perform skipping responding to the target data packet in response to the configuration field being not the designated data, or perform the customizing the data message format according to the target data packet in response to the configuration field being the designated data.

9. The heterogeneous acceleration system according to claim 5, further comprising an optical switch arranged between the data source end and the FPGA heterogeneous acceleration card, wherein
   the data source end is configured to send the target data packet to the optical switch;
   the optical switch is configured to forward the target data packet to the FPGA heterogeneous acceleration card, and forward the processed data to the data source end; and
   the FPGA heterogeneous acceleration card is further configured to return the processed data to the optical switch.

10. The heterogeneous acceleration system according to claim 5, further comprising a movable power supply apparatus, wherein
   the movable power supply apparatus is configured to supply power to the FPGA heterogeneous acceleration card.

11. The heterogeneous acceleration system according to claim 10, wherein a peripheral component interconnect express (PCIE) slot is provided in the movable power supply apparatus; and
   the movable power supply apparatus is configured to supply the power to the FPGA heterogeneous acceleration card by butting the PCIE slot with a PCIE gold finger of the FPGA heterogeneous acceleration card.

12. The heterogeneous acceleration system according to claim 10, wherein the movable power supply apparatus comprises an external power interface and a power adapter; and
   the movable power supply apparatus is further configured to connect a system external power supply through the external power interface, convert a first voltage value provided by the system external power supply into a second voltage value required by the FPGA heterogeneous acceleration card through the power adapter, and supply the power to the FPGA heterogeneous acceleration card based on the second voltage value.

13. One or more non-volatile computer-readable storage medium, storing computer-readable instructions, wherein the computer-readable instructions, upon execution by one or more processors, are configured to cause the one or more processors to:
   analyze a received target data packet to obtain data source end identification information;
   customize, in response to the data source end identification information not existing in a configuration information table, a data message format according to the received target data packet to obtain a target data message format, or read, in response to the data source end identification information existing in the configuration information table, the target data message format from the configuration information table; and
   perform, according to the target data message format, acceleration processing on the received target data packet to obtain processed data, and return the processed data to a data source end.

14. The heterogeneous acceleration method according to claim 1, wherein the received target data packet further comprises a data format of the data source end, a kernel type used for the acceleration processing of the received target data packet, and a destination Internet protocol (IP) to be sent after the acceleration processing of the received target data packet is completed.

15. The heterogeneous acceleration method according to claim 1, wherein before the customizing the data message format according to the received target data packet, or the reading the target data message format from the configuration information table, the method further comprises:
   setting, in advance, the configuration information table in which a correspondence between a plurality of data source end identification information and a plurality of data message formats is stored.

16. The heterogeneous acceleration system according to claim 5, wherein the FPGA heterogeneous acceleration card is configured to:
   set, in advance, the configuration information table in which a correspondence between a plurality of data source end identification information and a plurality of data message formats is stored.

17. The one or more non-volatile computer-readable storage medium according to claim 13, wherein the computer-readable instructions, upon execution by the one or more processors, are further configured to cause the one or more processors to:

update the configuration information table according to the target data message format after customizing the data message format according to the received target data packet to obtain the target data message format.

18. The one or more non-volatile computer-readable storage medium according to claim 13, wherein the computer-readable instructions, upon execution by the one or more processors, are further configured to cause the one or more processors to:
  determine whether a configuration field exists in the received target data packet before customizing the data message format according to the received target data packet and after determining that the data source end identification information does not exist in the configuration information table; and
  skip responding to the received target data packet in response to a non-existence of the configuration field, or perform the customizing the data message format according to the received target data packet in response to an existence of the configuration field.

19. The one or more non-volatile computer-readable storage medium according to claim 18, wherein the computer-readable instructions, upon execution by the one or more processors, are further configured to cause the one or more processors to:
  read the configuration field;
  determine whether the configuration field is designated data; and
  perform skipping responding to the received target data packet in response to the configuration field being not the designated data, or perform the customizing the data message format according to the received target data packet in response to the configuration field being the designated data.

20. The one or more non-volatile computer-readable storage medium according to claim 13, wherein the computer-readable instructions, upon execution by the one or more processors, are further configured to cause the one or more processors to:
  set, in advance, the configuration information table in which a correspondence between a plurality of data source end identification information and a plurality of data message formats is stored.

* * * * *